United States Patent [19]

Bruno et al.

[11] 4,144,875

[45] Mar. 20, 1979

[54] SOLAR COLLECTOR COMPRISING AN ENTRANCE WINDOW CONSISTING OF EVACUATED TUBES

[76] Inventors: Richard Bruno, Kirchstrasse 82, 5100 Aachen; Wilhelm Hermann, Bundesstrasse 20; Horst Hörster, Vogelsangstrasse 11, both of 5106 Roetgen; Reinhard Kersten, Meischenfeld 29, 5100 Aachen-Kornelimünster; Klaus Klinkenberg, Waldstrasse 39; Faramarz Mahdjuri, Ardennenstrasse 75, both of 5100 Aachen; John Bannigan, Hammstrasse 46, 5190 Stolberg, all of Fed. Rep. of Germany

[21] Appl. No.: 783,944

[22] Filed: Apr. 1, 1977

[30] Foreign Application Priority Data

Apr. 9, 1976 [DE] Fed. Rep. of Germany ....... 2615475
May 21, 1976 [DE] Fed. Rep. of Germany ....... 2622750
May 29, 1976 [DE] Fed. Rep. of Germany ....... 2624214

[51] Int. Cl.² .............................. F24J 3/02; F28F 1/10
[52] U.S. Cl. .................................... 126/271; 126/270; 165/168
[58] Field of Search ................ 126/270, 271; 165/168, 165/172; 237/1 A

[56] References Cited

U.S. PATENT DOCUMENTS

| 1,801,710 | 4/1931 | Abbot | 126/271 |
| 2,391,108 | 12/1945 | Trainer | 165/168 X |
| 2,998,006 | 8/1961 | Johnston | 126/271 |
| 3,952,725 | 4/1976 | Edmondson | 126/271 |
| 3,981,293 | 9/1976 | Gillery | 126/271 |
| 4,015,584 | 4/1977 | Haberman | 126/271 |
| 4,029,080 | 6/1977 | Warren | 126/270 |
| 4,054,125 | 10/1977 | Eckels | 237/1 A |

*Primary Examiner*—William F. O'Dea
*Assistant Examiner*—Larry Jones
*Attorney, Agent, or Firm*—William J. Streeter; Rolf E. Schneider

[57] ABSTRACT

A solar collector comprising a heat exchanger having a corrugated surface and an entrance window composed of evacuated transparent tubes respectively in contact with the corrugations.

15 Claims, 8 Drawing Figures

SOLAR COLLECTOR COMPRISING AN ENTRANCE WINDOW CONSISTING OF EVACUATED TUBES

This invention relates to a solar collector, comprising a plate-shaped heat exchanger which is provided with one or more ducts and which serves for transferring heat derived from collected solar radiation during operation to a heat transport medium fed through the ducts, and comprising a heat-insulating entrance window for solar radiation which consists of a plurality of sealed and evacuated transparent tubes which are adjacently arranged in contact with each other.

The heat transport medium may be, for example, water or air.

In a known solar collector of the kind set forth, the heat exchanger is constructed to be flat and the evacuated glass tubes are situated at a given distance from this heat exchanger.

Because it is difficult in practice to seal the adjacently arranged, contacting glass tubes relative to each other, rain-water and dust are likely to penetrate between the glass tubes and the heat exchanger of such known solar collector. Moreover, the air which is present between the heat exchanger and the glass tubes and which is heated at this area during operation can escape between the glass tubes, which leads to loss of efficiency.

A further drawback of this collector consists in the comparatively low transmission of sunlight through the entrance window, which is caused by the rather high reflection losses on the interfaces of the glass tube walls.

The present invention has for its object to provide a solar collector of the kind set forth which is substantially dustproof and rain-water proof and in which substantially no air is present between the entrance window and the heat exchanger.

To this end, the solar collector in accordance with the invention is characterized in that the tube portions which face the heat exchanger contact the heat exchanger at least over the major part of their relevant surfaces.

It is thus achieved that the heat exchanger and the tubes form an integral unit, substantially without clearance.

Optimum heat transfer between the tubes and the heat exchanger is thus obtained.

The tubes may have different cross-sectional shapes.

In a preferred embodiment of the solar collector in accordance with the invention, the heat exchanger has a corrugated or undulated profile with corrugations or arcuate dales in which the tube portions of complementary shape are accommodated.

A further preferred embodiment of the solar collector in accordance with the invention is characterized in that the heat exchanger has a double-walled construction, the ducts for the heat transport medium being formed by or between the two walls.

Advantageously, the rear wall of such an arrangement which is remote from the entrance window and which has the undulated profile with arcuate dales may be constructed to be rigid, whilst the front wall which accommodates the tube portions consists of a foil only the edges of which are connected to the rear wall in a sealing manner, and which is associated with the crests of the rear wall, situated between the edges, so that it projects into the individual dales of the rear wall in a movably suspended manner. This offers the advantage that the movably suspended front wall foil and the tubes are in perfect contact with each other, so that complete thermal contact with the tubes is obtained.

In order to keep the tubes which are loosely arranged on the foil in position, they can be anchored in a resilient manner in accordance with the invention.

In a still further preferred embodiment of the solar collector in accordance with the invention, the sides of the dales which are remote from the entrance window are associated with tubes in which the ducts for the heat transport medium are situated.

Alternatively, the ducts for the heat transport medium can extend within the heat exchanger at the area of the crests.

Another preferred embodiment of the solar collector in accordance with the invention is characterized in that on the inner surfaces of the tube portions facing the heat exchanger there is provided a layer of a material having an absorption factor $\alpha \geq 0.85$ for solar radiation and an emission factor $\epsilon \leq 0.3$ for heat radiation.

Besides improved absorption of solar radiation, less reflection of solar radiation then occurs on the last two tube wall interfaces through which the solar radiation passes.

The selective absorbing layer has a high absorption factor in the total spectral range of sunlight ($\lambda = 0.3$ to 2 microns) and a low emission factor in the range of heat radiation ($\lambda = 3$ to 30 microns). The selective absorbing layer may consist, for example, of nickel oxide, copper oxide or cobalt sulphide on a metal substrate (Ag, Cu, Al). Alternatively, a selective absorber may consist of a non-selective absorbing substance, such as black glass enamel, which is covered with tin-doped indium oxide.

A selective absorbing layer provided on the inner surfaces of the tube portions facing the heat exchanger is accompanied by a temperature increase of the bare tube wall portions adjoining this layer during operation. For glass tubes ($\epsilon > 0.8$), this implies a comparatively high heat loss by radiation.

In order to prevent heat losses at the transitions between the selective absorbing layer and the bare tube wall, the layer in accordance with the invention extends, in a cross-section of the tubes, over a range of from 120° to 160° and adjoins, on its longitudinal sides, a reflective metal strip which extends in a cross-section on each side over a range of from 15° to 25° and which is also provided on the inner surfaces.

The reflective metal strip reduces the heat losses. Moreover, solar radiation which is obliquely incident is reflected to the selective absorbing layer. As a result, the dimensions of this layer may be smaller, which leads to lower heat losses.

If the selective absorbing layer consists of a black material on a metal substrate (for example, the said nickel oxide on, for example, Ag), the metal substrate in accordance with the invention extends on each side over a range of from 15° to 25° beyond the longitudinal sides of the black material.

Thus, no additional process is required for the manufacture of the reflective metal strip.

A further preferred embodiment of the solar collector in accordance with the invention is characterized in that on the outer surfaces of the tube portions which face the heat exchanger there is provided a layer of a material having an absorption factor $\alpha \geq 0.85$ for solar radiation and an emission factor $\epsilon \leq 0.3$ for heat radiation.

In addition to improved absorption of solar radiation, less reflection of solar radiation then occurs at the last tube interface through which the sunlight passes.

In accordance with a further preferred embodiment of the solar collector in accordance with the invention, the heat exchanger is made of a material having an absorption factor $\alpha_1 \geqq 0.85$ for heat radiation, for example, a dark metal or a black synthetic material, or the side of the heat exchanger which faces the entrance window is covered with a layer of such a material.

Intimate contact between the tubes and the heat exchanger is achieved in accordance with the invention when the tube portions are connected to the heat exchanger by means of an adhesive. The colour of the adhesive is preferably black, so that it also serves as an absorbing layer. The adhesive may be, for example, tar, pitch, asphalt and the like.

The efficiency of the solar collector can be increased in accordance with the invention by providing at least the tube portions which are remote from the heat exchanger with a light-transmitting but infrared-reflective layer on their inner surfaces.

A selective heat-reflective layer of this kind may consist, for example, of gold or of tin-doped indium oxide.

Layers of this kind transmit solar radiation ($\lambda = 0.3-2$ microns) but reflect (reflection factor $R > 0.7$) heat radiation originating from the heat exchanger ($\lambda = 3-30$ microns).

The invention will now be described in detail with reference to the accompanying drawings in which.

Figure 1:
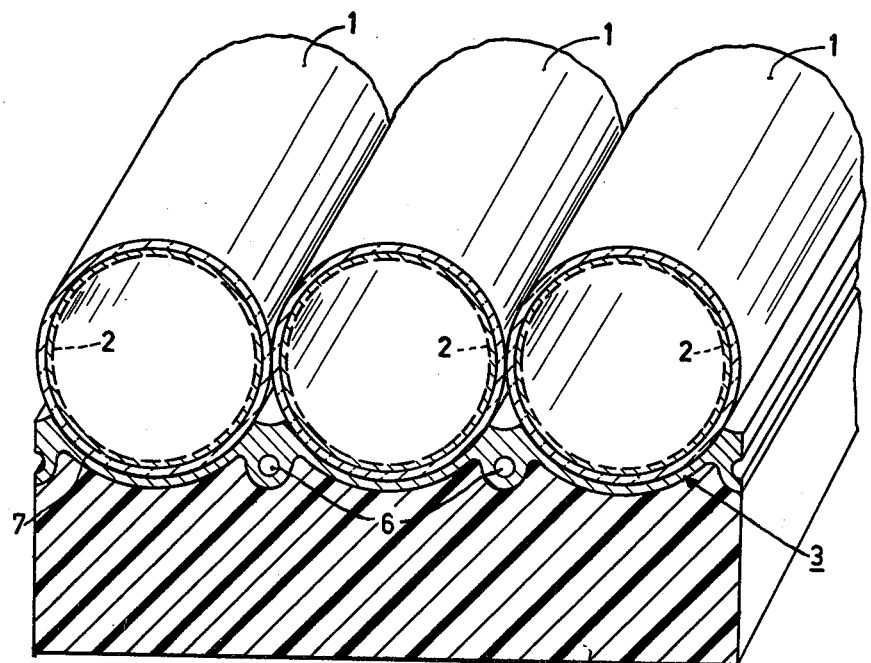
FIG. 1 is a perspective cross-sectional front view of a part of an embodiment of a solar collector comprising evacuated, transparent, circle-cylindrical tubes which bear on the heat exchanger.

The reference numeral 1 in FIG. 1 denotes a plurality of adjacently arranged, contacting glass tubes having a circular cross-section which are sealed on their ends (not shown) and which are evacuated, for example, to a residual pressure of less than 1 millibar.

The entire inner surface in the cylindrical region of each tube 1 is provided with a solar radiation transmitting but infrared reflective layer 2 which consists, for example, of tin-doped $In_2O_3$.

Figure 2:
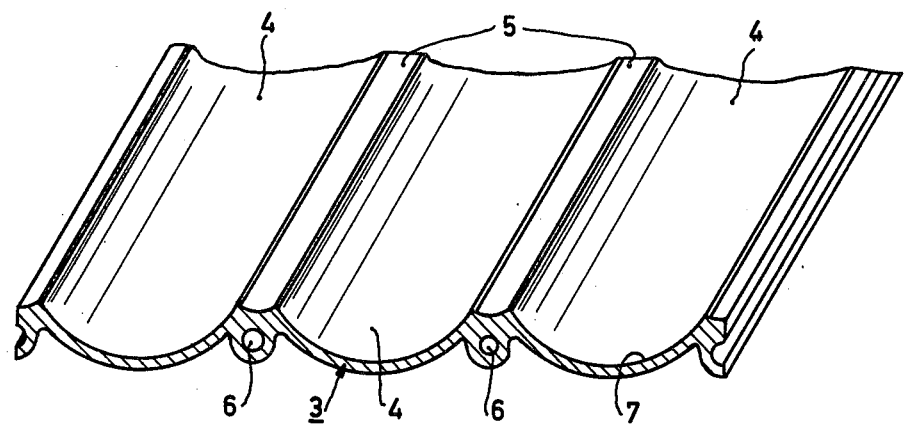
FIG. 2 is a separate perspective cross-sectional view of the heat exchanger shown in FIG. 1.

There is also provided a heat exchanger 3 which consists, for example, of extruded aluminium, of copper or of zinc-plated sheet iron having a thickness, for example, between 0.5 and 3 mm. The heat exchanger 3 has a corrugated or undulated profile with corrugations or arcuate dales 4 and grooved crests 5 (FIG. 2). At the area of the crests 5, ducts 6 are provided in the heat exchanger 3 for a heat transport medium such as water or air.

The greatest portion of the circle-cylindrical surfaces of the tubes 1 which faces the heat exchanger 3 bears against the heat exchanger in the corrugations or dales 4.

The surface of the heat exchanger 3 which faces the tubes 1 is covered with a suitable heat-absorbing layer 7, for example, consisting of black glass enamel.

The tubes 1 can be glued to the heat exchanger 3. When use is made of a black adhesive, this adhesive itself forms the heat absorbing layer 7 and the glass enamel can be dispensed with.

The side of the heat exchanger 3 which is remote from the tubes 1 is thermally insulated relative to the surroundings by means of an insulating material 8, for example, mineral wool or foamed plastic.

During operation, solar radiation incident on the tubes 1 is absorbed by the layer 7 and is transferred in the form of heat, via the heat exchanger 3, to a heat transport medium which is fed through the ducts 6. Heat radiation emitted by the layer 7 is reflected to the heat exchanger 3 again by the layer 2 on the inner surface of the tubes 1.

If the tubes 1 are not connected to each other in a waterproof manner, the grooved crests 5 may be used as rain drains.

Figure 3:
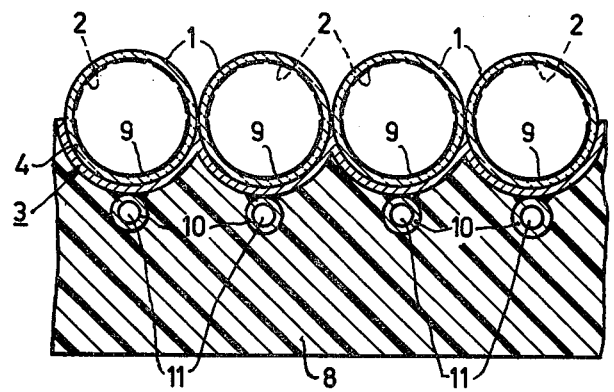
FIG. 3 is a cross-sectional view of a solar collector, the side of the heat exchanger which is remote from the evacuated tubes being associated with tubular ducts.

Parts of the solar collector shown in FIG. 3 which correspond to parts shown in FIG. 1 are denoted by the same reference numerals.

The dales 4 of the heat exchanger 3 are formed in the present case by arcs of a circle of 180°. The lower halves of the tubes 1 thus completely bear against the heat exchanger 3 in the dales 4 and may again be glued therein.

The light-transmitting but heat-reflecting layer 2 is in the present case situated on the inner surface only in the upper halves of the tubes 1 and adjoins a heat-absorbing layer 9 of, for example, glass enamel which is provided on the inner surface of the lower tubes halves.

As a result of the provision of the heat absorbing layer 9 on the inner surface of the lower tube halves, solar radiation no longer passes through tube portions, which means that reflection of solar radiation on the interfaces of these tube portions with the heat exchanger is prevented. Thus the collector efficiency is increased.

On the sides of the dales 4 which are remote from the tubes 1 tubes 10 are associated with the heat exchanger 3, for example, by glueing, soldering or welding. Tubes 10 provide ducts 11 for a heat transport medium. The layer 2 may alternatively extend over the layer 9.

Figure 4:
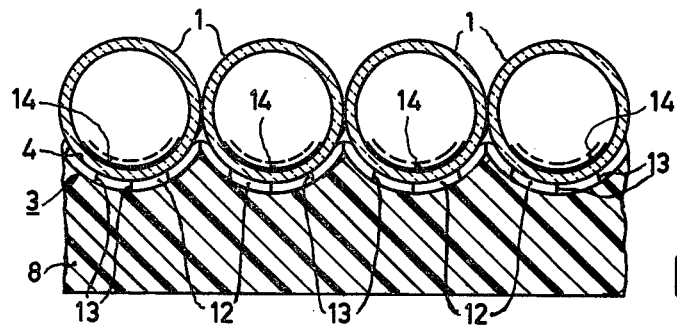
FIG. 4 is a cross-sectional view of a solar collector having a double-walled hollow heat exchanger.

The heat exchanger 3 of the solar collector shown in FIG. 4 has a double-walled hollow construction, ducts 12 for the heat transport medium being formed by means of partitions 13.

The heat-exchanger walls may be made, for example, of metal foils, thin sheets of synthetic material or asbestos.

The portions of the tubes 1 which are situated in the dales 4 of the heat exchanger 3 are provided on the inner surface with a layer 14 of a material which suitably absorbs the solar radiation and which emits only a little heat radiation, such as nickel oxide or copper oxide on a metal substrate of, for example, silver, copper or aluminium.

Figure 5:
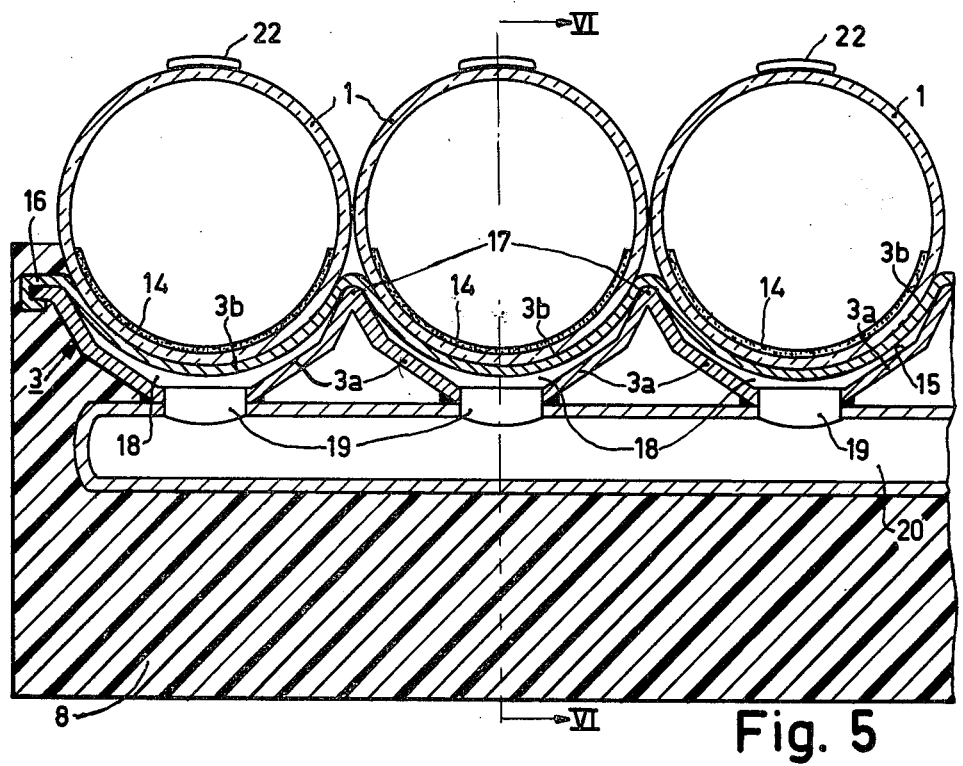
FIG. 5 is a cross-sectional view taken along the line V—V of FIG. 6 of an embodiment of a solar collector having a double-walled hollow heat exchanger whose wall which is contacted by the evacuated tubes consists of a movably suspended foil.

The parts of the solar collector shown in FIG. 5 which correspond to those shown in FIG. 4 bear the same reference numerals.

The wall 3a of the heat exchanger 3 which is remote from the tubes 1 is rigid and has an undulated profile with arcuate dales 15. The wall 3b which supports the tubes 1 consists of a foil which has a thickness of, for example, 0.1 mm and which is connected in a sealing manner to the rigid wall 3a only at its edges 16; this is realized, for example, by soldering, welding or glueing.

At the areas of the crests 17 of the wall 3a, the foil 3b is associated therewith or is secured thereto, for example, via separate point-shaped joints, so that it projects into the individual dales 15 of the wall 3a in a movably suspended manner. Thus, narrow ducts 18 for the heat transport medium are formed between the walls 3a and 3b, the said ducts communicating, via openings 19, with an inlet 20 and an outlet 21 (FIG. 6) for a heat transport medium.

The tubes 1 are arranged on the foil 3b so that the foil is taut and makes suitable contact with the relevant tube portions. During operation, the heat transport medium flowing through the ducts 18 also keeps the foil 3b pressed against the tubes 1.

Clamping springs 22, one end of which is connected to the insulating material 8, also press the tubes lightly against the foil 3b and keep them in position. Thus, suitable thermal contact therebetween is always ensured.

The rigid wall 3a may consist, for example, of extruded synthetic material or metal (copper, aluminium, iron, sheet metal clad with a layer of copper or brass). The foil 3b may be made, for example, of aluminium, copper, brass or a synthetic material (polycarbonate, polyfluoroethylene).

Figure 6:
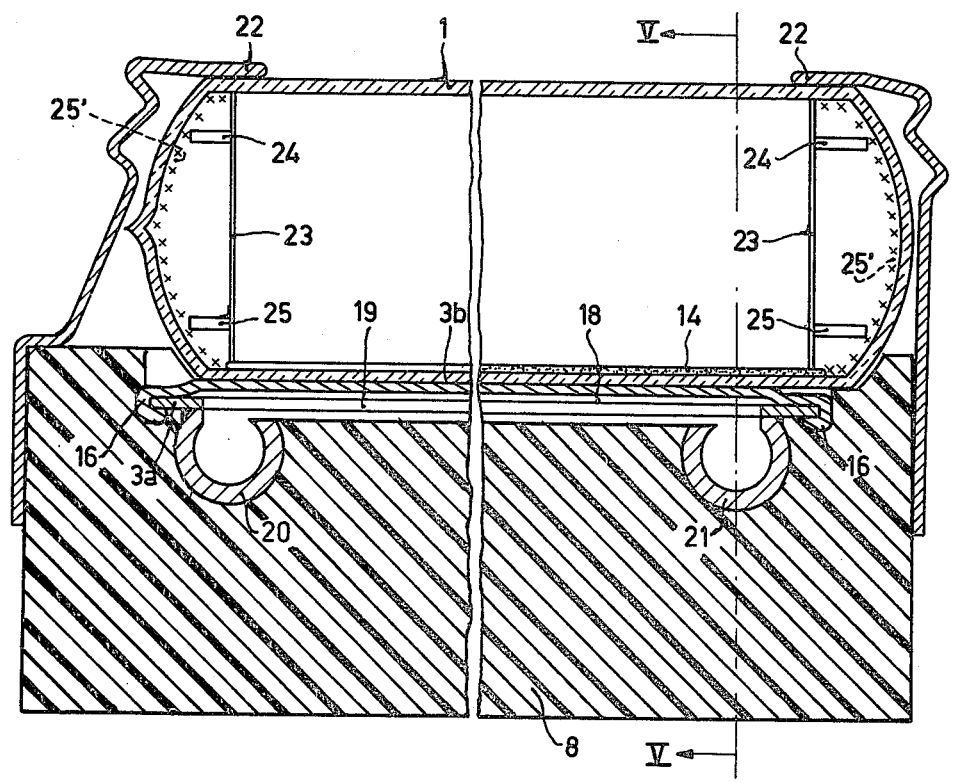
FIG. 6 is a cross-sectional view taken along the line VI—VI of FIG. 5.

As appears from FIG. 6, reflectors 23 are arranged in the tubes at the tube ends, transversely of the tube axis; the reflectors may consist of mica provided with vapour-deposited aluminium. These reflectors furthermore each support a getter 24 of, for example, barium and a metal mixture 25 of, for example, aluminium, copper, lead, silver or gold. After the evacuation of the tubes 1, the getters and the metal mixtures are exposed to external induction heating. Consequently, the getters become active and collect residual gases, whilst the metal mixtures evaporate and are deposited on the dome-shaped tube ends where they form a metal mirror 25' whereby heat losses are reduced.

Figure 7:
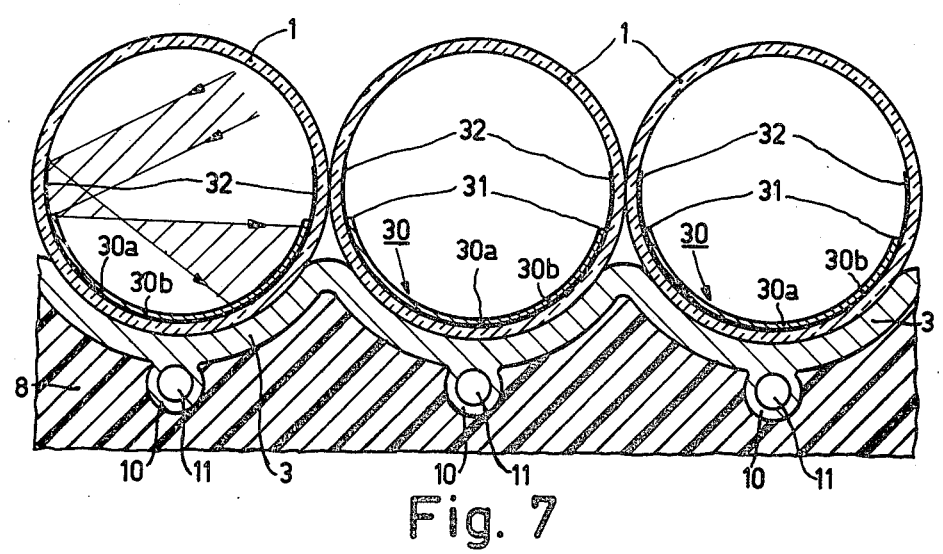
FIG. 7 is a cross-sectional view of an embodiment of a solar collector in which the evacuated tubes are provided on their inner surfaces, at the area of the heat exchanger, with a selective, solar radiation absorbing layer and with an adjoining reflective metal strip.

In the solar collector shown in FIG. 7, the portions of the tubes 1 which face and contact the heat exchanger 3 are covered on their inner surface with a selective layer 30 which suitably absorbs solar radiation and which emits little heat radiation. The layer 30 consists of a black material 30a, for example, nickel oxide or copper oxide, on a metal substrate 30b of, for example, silver, nickel, copper or aluminium.

The selective layer 30 in this embodiment extends through the cross-section of the tube 1 over an angle of approximately 150°.

The longitudinal sides 31 of the layer 30 are in each case adjoined by a reflective metal strip 32 which extends through the cross-section of the tubes 1 over an angle of approximately 25° and which in the present instance consists of a prolongation of the metal substrate 30b of the selective layer 30.

As is shown for the left tube 1, solar radiation which is obliquely incident is reflected to the selective layer 30 by the metal strip 32, the collector efficiency thus being increased.

If desired, the tubes 1 can again be provided with a sunlight transmitting but infrared-reflective layer, either on the inner surface of the tubes or on the outer surface of the portions of the tubes which are remote from the heat exchanger 3.

As in the solar collector shown in FIG. 3, tubes 10 are associated with the heat exchanger on the side of the heat exchanger 3 which is remote from the tubes 1. Ducts 11 for the heat transport medium are provided by the tubes 10.

Figure 8:
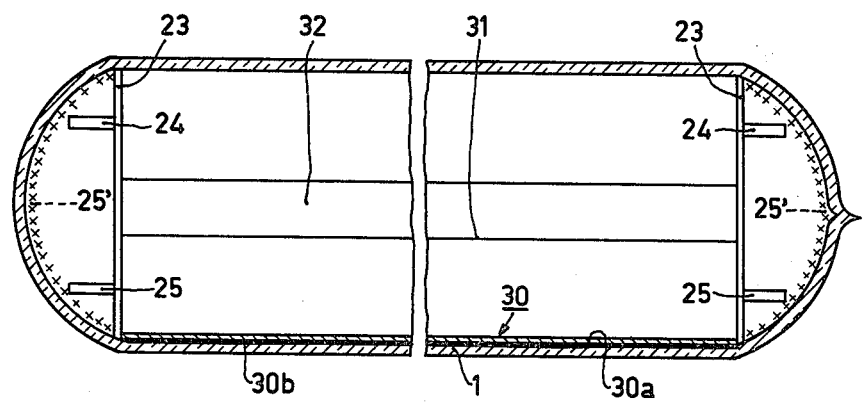
FIG. 8 is a longitudinal sectional view of an evacuated tube as shown in FIG. 7.

FIG. 8 shows that, as in FIG. 6, end reflectors 23, getters 24 and metal mixtures 25 are present. The metal mixtures form metal mirrors 25' after evaporation.

What is claimed is:

1. A solar collector, which comprises a plate-shaped heat exchanger having a corrugated profile, said heat exchanger being provided with a plurality of ducts and serving to transfer heat derived from collected solar radiation during operation to a heat transport medium fed through said ducts, and a heat-insulating entrance window for solar radiation consisting of a plurality of sealed and evacuated transparent tubes adjacently arranged in contact with each other, the tube portions facing the heat exchanger being in contact with the corrugations therein, and said tube portions and said corrugations being of complementary shape.

2. A solar collector according to claim 1, in which the heat exchanger has a corrugated double-walled construction forming the ducts for the heat transport medium.

3. A solar collector according to claim 2, in which the rear wall of the double-walled construction remote from the entrance window is corrugated and is rigidly constructed, and the front wall accommodates the tube portions and consists of a foil, only the edges of which are sealed to the rear wall, said foil being associated with the crests of the corrugations so that it projects into the individual corrugations in a movably suspended manner.

4. A solar collector according to claim 3, in which the tube portions are loosely arranged on the foil and are anchored thereon in a resilient manner.

5. A solar collector according to claim 1, in which the ducts for the heat transport medium are situated adjacent the bottoms of the corrugations.

6. A solar collector according to claim 1, in which the ducts for the heat transport medium extend inside the crests of the corrugations.

7. A solar collector according to claim 1 in which the inner surfaces of the tube portions facing the heat exchanger are provided with a layer of a material having an absorption factor $\alpha \geq 0.85$ for solar radiation and an emission factor $\epsilon \leq 0.3$ for heat radiation.

8. A solar collector according to claim 7, in which said layer extends over a cross-sectional tubular portion of 120° to 160° and adjoins, on each longitudinal side, a reflective metal strip extending over a cross-sectional tubular portion of 15° to 25°.

9. A solar collector according to claim 7, in which said layer consists of a black material on a metal substrate, with the metal substrate extending over a cross-sectional tubular portion of 15° to 25° beyond each longitudinal side of the black material.

10. A solar collector according to claim 1, in which the outer surfaces of the tube portions facing the heat exchanger are provided with a layer of a material having an absorption factor $\alpha \geqq 0.85$ for solar radiation and an emission factor $\epsilon \leqq 0.3$ for heat radiation.

11. A solar collector according to claim 1, in which the heat exchanger consists of a material having an absorption factor $\alpha_1 \geqq 0.85$ for heat radiation.

12. A solar collector according to claim 1, in which the surface of the heat exchanger in contact with the entrance window is covered with a layer of a material having an absorption factor $\alpha_1 \geqq 0.85$, for heat radiation.

13. A solar collector according to claim 1, in which the tube portions are connected to the heat exchanger by means of an adhesive.

14. A solar collector according to claim 13, in which the adhesive is black.

15. A solar collector according to claim 1, in which the inner surface of at least the tube portions remote from the heat exchanger is provided with a light-transmitting but infrared-reflective layer.

* * * * *